UNITED STATES PATENT OFFICE.

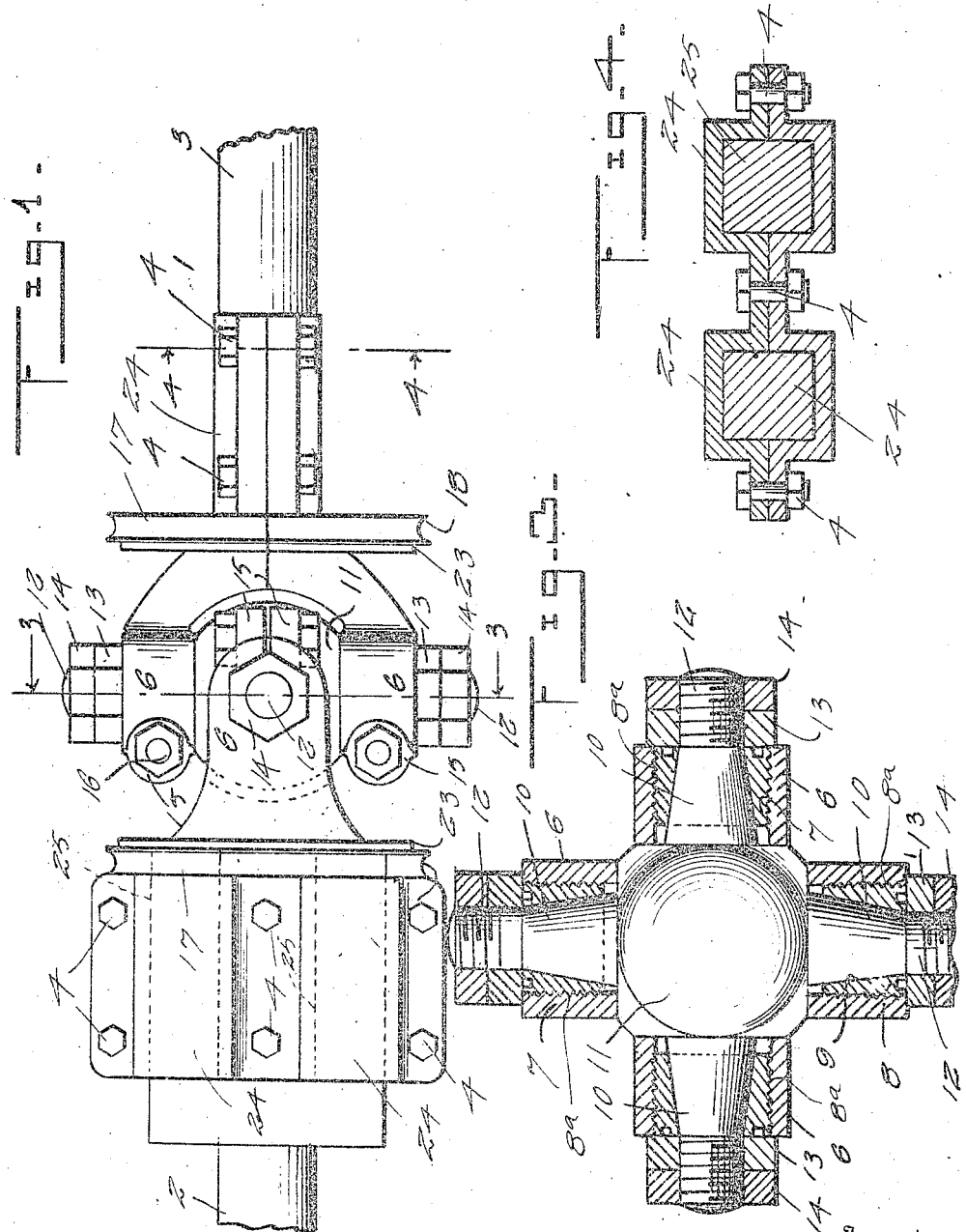

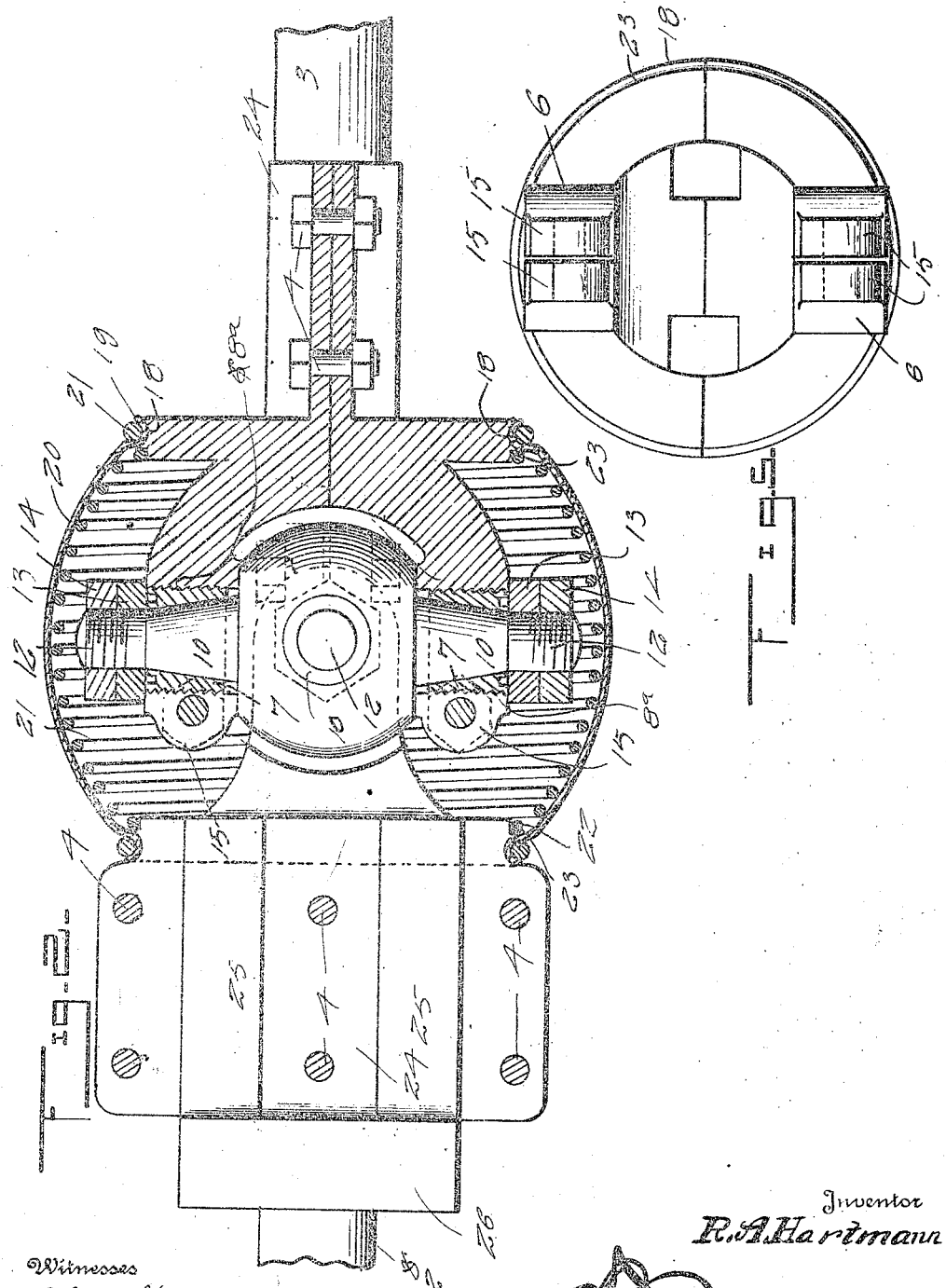

RICHARD A. HARTMANN, OF HARTFORD, CONNECTICUT.

UNIVERSAL JOINT.

1,288,577.  Specification of Letters Patent.  Patented Dec. 24, 1918.

Application filed October 9, 1917.  Serial No. 195,586.

*To all whom it may concern:*

Be it known that I, RICHARD A. HARTMANN, a subject of the Emperor of Germany, residing at Hartford, in the county of Hartford and State of Connecticut, have invented certain new and useful Improvements in Universal Joints; and I do hereby declare the following to be a full, clear, and exact description of the invention, such as will enable others skilled in the art to which it appertains to make and use the same.

The invention relates to improvements in universal joints.

The object of the present invention is to improve the construction of universal joints and to provide a simple, practical and efficient construction for effectively excluding dust and dirt from the joints.

A further object of the invention is to increase the strength, durability and efficiency of the joint and to enable the wear to be sustained by removable bushings adapted to be readily replaced when necessary, whereby an efficient bearing is maintained at all times.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to without departing from the spirit or sacrificing any of the advantages of the invention.

In the drawings:

Figure 1 is a side elevation of a universal joint constructed in accordance with this invention.

Fig. 2 is a longitudinal sectional view of the same.

Fig. 3 is a transverse sectional view on the line 3—3 of Fig. 1.

Fig. 4 is a similar view on the line 4—4 of Fig. 1.

Fig. 5 is an end view of one of the coupling sleeves or members.

Like numerals of reference designate corresponding parts in all the figures of the drawings.

In the accompanying drawings, in which is illustrated the preferred embodiment of the invention, the universal joint comprises in its construction a pair of sleeves or coupling members 1 divided longitudinally and clamped on the adjacent ends of shafts 2 and 3 by bolts 4 which pierce flanged portions of the sections 5 of the coupling sleeves or members. The coupling sleeves or members are provided with arms 6 having openings 7 for the reception of bushings 8 threaded into the openings 7 as shown at 8ª and also provided with tapered openings 9 to form bearings for tapered pivots or pins 10 of a block 11. The pivots or pins 10, which are arranged at diametrically opposite points on the block 11, as clearly illustrated in Fig. 3 of the drawings, are preferably formed integral with the same and they have threaded outer portions 12 for the reception of lock nuts 13 and 14 which are adapted to take up side motion and prevent the arms from spreading. The bushings, which receive the wear and which may be readily replaced when worn, are adapted to be easily adjusted to take up the wear and when it is desired to adjust the bushings the nuts 13 and 14 are unscrewed sufficiently to enable the bushings to be screwed down and seated. The bushings are preferably provided with slots or recesses to receive a spanner or other tool for adjusting them. The arms 6 are split at their terminals and are provided thereat with ears 15 for the reception of bolts 16 by means of which the bushings are firmly and detachably clamped in the openings of the arms. The block 11 is preferably spherical at the central or body portion thereof at the inner ends of the pivots or pins, as shown.

The sleeves or coupling members are provided at the outer ends of the arms with circular heads or flanges 17 having circumferential grooves 18 for the reception of the opposite edges 19 of a flexible covering 20 of leather or other suitable material which is secured in the grooves 18 by spring clamping rings 21. The spring clamping rings 21, which are constructed of suitable resilient material, are adapted to be sprung over the circular heads 17 for clamping the covering 20 in position. The flexible covering 20 is oppositely tapered and curved longitudinally of the joints to provide a spherical formation and it is maintained in proper position and prevented from collapsing by a coiled spring 21 which is oppositely tapered and which has its terminal coils 22 arranged upon ledges 23 formed at the periphery of the circular heads 12 at the inner sides of the grooves 18. This construction will provide a perfectly tight dust-proof covering which will be flexible and yieldable to the movements of the members of the universal joint and the coiled spring will return the covering to its proper expanded or extended position after a movement of the joint.

One or both of the coupling sleeves or members may be provided with a pair of rectangular sockets 24 for the reception of spaced sides 25 of a forked portion 26 which may be formed on one or both of the shafts 2 and 3. The forked portion 26 is composed of the spaced parallel side portions and the transverse connecting portions, the side portions being squared so that they will fit the rectangular sockets. By constructing the shaft in this manner, the heavy strain is taken from the center and will not be so hard on the bearing. At the same time the strength of the connection is materially increased as there is twice the amount of attaching surface for securing the shaft to the coupling sleeve or member.

It will be seen that the universal joint is dust-proof and that any looseness or lost motion may be readily taken up by the tightening of the nuts and bolts and the arms of the coupling sleeves or members.

What is claimed is:

1. A universal joint including a pair of coupling members provided with circular heads, means for connecting the adjacent ends of the members, a flexible covering of approximately spherical form having openings at opposite ends and fitted on the circular heads and secured to the same, and a coiled spring arranged within the flexible covering and maintaining the same in an expanded or extended position.

2. A universal joint including a pair of coupling members provided with circular heads, means for connecting the adjacent ends of the members, a flexible covering of approximately spherical form having openings at opposite ends and fitted on the circular heads and secured to the same, and a coiled spring arranged within the flexible covering and maintaining the same in an expanded or extended position, the terminal coils of the spring being seated upon the circular heads of the coupling sleeves or members.

3. A universal joint including a pair of coupling members provided with circular heads having outer peripheral grooves and provided with inner circumferential ledges, means for connecting the coupling members, a flexible substantially spherical covering having opposite openings receiving the heads, clamping rings arranged in the grooves and securing the covering to the heads, and an oppositely tapered coiled spring arranged within the flexible covering and having terminal coils mounted on the circumferential seat, said coiled spring maintaining the flexible covering in an extended or expanded position.

In testimony whereof I affix my signature in presence of two witnesses.

RICHARD A. HARTMANN.

Witnesses:
 ALBERT C. BILL,
 CYRIL K. SMITH.